US011828728B2

(12) United States Patent
Lanza di Scalea

(10) Patent No.: US 11,828,728 B2
(45) Date of Patent: Nov. 28, 2023

(54) ULTRASONIC INSPECTION OF RAILROAD TRACKS USING RAILCAR MOUNTED ULTRASONIC RECEIVERS

(71) Applicant: The Regents of the University of California, Oakland, CA (US)

(72) Inventor: Francesco Lanza di Scalea, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1100 days.

(21) Appl. No.: 16/466,589

(22) PCT Filed: Dec. 5, 2017

(86) PCT No.: PCT/US2017/064692
§ 371 (c)(1),
(2) Date: Jun. 4, 2019

(87) PCT Pub. No.: WO2018/106677
PCT Pub. Date: Jun. 14, 2018

(65) Prior Publication Data
US 2019/0346408 A1 Nov. 14, 2019

Related U.S. Application Data

(60) Provisional application No. 62/430,286, filed on Dec. 5, 2016.

(51) Int. Cl.
*G01N 29/14* (2006.01)
*G01N 29/04* (2006.01)
(Continued)

(52) U.S. Cl.
CPC ............. *G01N 29/14* (2013.01); *G01N 29/04* (2013.01); *G01N 29/4409* (2013.01);
(Continued)

(58) Field of Classification Search
CPC .... G01N 29/14; G01N 29/04; G01N 29/4409; G01N 29/46; G01N 29/50; G01N 2291/0234; G01N 2291/2623
(Continued)

(56) References Cited

U.S. PATENT DOCUMENTS 4,174,636 A * 11/1979 Pagano ................ G01N 29/043
73/639
4,662,224 A * 5/1987 Turbe ..................... G01N 29/48
73/636
(Continued)

FOREIGN PATENT DOCUMENTS

CN 107727741 A * 2/2018 ............. G01N 29/04
GB 2372569 A * 8/2002 ............... B61K 9/10
(Continued)

OTHER PUBLICATIONS

Mazilu, Traian. (2013). An Analysis of the Interaction Between Two Wheels and a Discretely Supported Rail. Annals of Faculty Engineering Hunedoara—International Journal of Engineering. (Year: 2013).*
(Continued)

*Primary Examiner* — Peter J Macchiarolo
*Assistant Examiner* — Monica S Young
(74) *Attorney, Agent, or Firm* — Mintz Levin Cohn Ferris Glovsky and Popeo, P.C.

(57) ABSTRACT

An apparatus for inspecting a railroad track may include a first sensor, a second sensor, and a controller. The first sensor may detect a first signal while the second sensor may detect a second signal. The first signal may correspond to a response of the railroad track, at a first location on the railroad track, to a motion of a rail car wheel on the railroad track. The second signal may correspond to the response of the railroad track, at a second location on the railroad track,
(Continued)

to the motion of the rail car wheel on the railroad track. The controller may generate, based on the first signal and the second signal, a transfer function corresponding to the response of the railroad track at the second location to stimuli applied at the first location. Defects in the railroad track may be detected by analyzing the transfer function.

19 Claims, 13 Drawing Sheets

(51) Int. Cl.
  *G01N 29/44* (2006.01)
  *G01N 29/46* (2006.01)
  *G01N 29/50* (2006.01)

(52) U.S. Cl.
  CPC ............. *G01N 29/46* (2013.01); *G01N 29/50* (2013.01); *G01N 2291/0234* (2013.01); *G01N 2291/2623* (2013.01)

(58) Field of Classification Search
  USPC .............................................. 702/39; 73/636
  See application file for complete search history.

(56) References Cited

U.S. PATENT DOCUMENTS

| | | | | |
|---|---|---|---|---|
| 5,419,196 | A * | 5/1995 | Havira | G01N 29/221 |
| | | | | 73/636 |
| 5,743,495 | A * | 4/1998 | Welles, II | B61L 23/047 |
| | | | | 246/169 R |
| 6,055,862 | A * | 5/2000 | Martens | G01N 29/28 |
| | | | | 73/635 |
| 7,389,694 | B1 * | 6/2008 | Hay | G01N 29/265 |
| | | | | 73/635 |
| 8,820,166 | B2 * | 9/2014 | Wigh | G01N 29/069 |
| | | | | 73/636 |
| 9,950,715 | B2 * | 4/2018 | Lanza di Scalea | B06B 1/02 |
| 2007/0208841 | A1 * | 9/2007 | Barone | B61L 15/0027 |
| | | | | 709/223 |
| 2009/0282923 | A1 * | 11/2009 | Havira | G01N 29/28 |
| | | | | 73/636 |
| 2010/0307250 | A1 * | 12/2010 | Brignac | G01N 29/043 |
| | | | | 73/624 |
| 2011/0238336 | A1 * | 9/2011 | Di Scalea | G01N 29/043 |
| | | | | 702/56 |
| 2013/0111997 | A1 | 5/2013 | Pagano | |
| 2013/0312524 | A1 * | 11/2013 | Mian | G01N 29/12 |
| | | | | 73/579 |
| 2014/0069193 | A1 | 3/2014 | Graham et al. | |
| 2015/0106037 | A1 * | 4/2015 | Hall | H04W 4/027 |
| | | | | 702/39 |
| 2016/0091465 | A1 * | 3/2016 | Cooper | G01N 29/11 |
| | | | | 356/73.1 |
| 2016/0094165 | A1 * | 3/2016 | Lee | H02P 6/16 |
| | | | | 318/400.06 |
| 2017/0255824 | A1 * | 9/2017 | Miller | G06V 20/00 |
| 2018/0156757 | A1 * | 6/2018 | Nagrodsky | G01V 1/001 |
| 2019/0161919 | A1 * | 5/2019 | Gilbert | G01N 29/225 |

FOREIGN PATENT DOCUMENTS

| | | | | |
|---|---|---|---|---|
| JP | 2001272380 | A * | 10/2001 | |
| WO | WO-9422008 | A1 * | 9/1994 | ........... G01N 29/221 |
| WO | WO-2018087341 | A1 * | 5/2018 | ........... B61L 27/0027 |
| WO | WO-2020025390 | A1 * | 2/2020 | ........... B61L 23/044 |

OTHER PUBLICATIONS

Mazilu, Traian. "Analysis of infinite structure response due to moving wheel in the presence of irregularities via Green's functions method." Proceedings of the Romanian Academy, Series A: Mathematics, Physics, Technical Sciences, Information Science 10.2 (2009): 139-150 (Year: 2009).*

Mazilu, Traian. "A Dynamic Model for the Impact Between the Wheel Flat and Rail." Universit"Politehnica" of Bucharest Scientific Bulletin, Series D: Mechanical Engineering 69.2 (2007): 45-58. (Year: 2007).*

Sheng, X. & Xiao, Xinbiao & Zhang, Shumin. (2016). The time domain moving Green function of a railway track and its application to wheel-rail interactions. Journal of Sound and Vibration. 377. 10.1016/j.jsv.2016.05.011. (Year: 2016).*

Mazilu, Traian. (2007). Green's functions for analysis of dynamic response of wheel/rail to vertical excitation. Journal of Sound and Vibration. 306. 31-58. 10.1016/j.jsv.2007.05.037. (Year: 2007).*

* cited by examiner

ULTRASONIC INSPECTION OF RAILROAD TRACKS USING RAILCAR MOUNTED ULTRASONIC RECEIVERS

CROSS-REFERENCE TO RELATED APPLICATION

This application is a national phase entry of Patent Cooperation Treaty Application PCT/US2017/064692 filed Dec. 5, 2017, entitled "ULTRASONIC INSPECTION OF RAILROAD TRACKS," which claims priority to U.S. Provisional Application No. 62/430,286 filed on Dec. 5, 2016 and entitled HIGH-SPEED ULTRASONIC INSPECTION OF RAILROAD TRACKS, the disclosure of these are incorporated herein by reference in their entirety.

STATEMENT OF GOVERNMENT SPONSORED SUPPORT

This invention was made with government support under grant No. FR-RRD-0027-11-01 awarded by Federal Railroad Administration (FRA). The government has certain rights in the invention.

BACKGROUND

Regular inspection of railroad tracks may be imperative for preventing catastrophes such as, for example, train derailments and/or the like. For example, railroad tracks may be inspected for the presence of defects such as, for example, cracks and/or the like, which can compromise the structural integrity of the railroad tracks. However, track defects may often be internal to the rail and therefore undetectable by mere visual inspection.

SUMMARY

Apparatuses and methods are provided for ultrasonic inspection of railroad tracks. An apparatus for ultrasonic inspection of railroad tracks may include a first sensor, a second sensor, and a controller. The first sensor may be configured to at least detect a first signal corresponding to a first response of a railroad track, at a first location on the railroad track, to a motion of a rail car wheel on the railroad track. The second sensor may be configured to at least detect a second signal corresponding to a second response of the railroad track, at a second location on the railroad track, to the motion of the rail car wheel on the railroad track. The controller may be configured to generate, based at least on the first signal and the second signal, a first transfer function associated with a first portion of the railroad track between the first location and the second location. The first transfer function may correspond to a third response of the railroad track at the second location to stimuli applied at the first location. The controller may be further configured to determine, based at least on an analysis of the first transfer function, whether one or more defects are present in the railroad track.

In some variations, one or more features disclosed herein including the following features can optionally be included in any feasible combination. The first signal may be a product of a second transfer function associated with the rail car wheel, a third transfer function associated with the portion of the railroad track between the rail car wheel and the first location, and a fourth transfer function associated with the first sensor and/or the second sensor. The second signal may be a product of the first transfer function, the second transfer function, the third transfer function, and the fourth transfer function.

In some variations, the controller may be configured to generate the first transfer function by at least processing the first signal and the second signal to remove the second transfer function, the third transfer function, and the fourth transfer function. The processing may include determining a cross-correlation the first signal and the second signal, and normalizing the cross-correlation of the first signal and the second signal. The processing may include determining a deconvolution of the first signal and the second signal by at least computing a ratio between the first signal and the second signal.

In some variations, the controller may be further configured to at least apply a Fast Fourier Transform to the first signal and/or the second signal in order to convert the first signal and/or the second signal from a time domain into a frequency domain. The controller may be further configured to at least apply an Inverse Fast Fourier Transform to the first transfer function in order to convert the first transfer function from the frequency domain into the time domain.

In some variations, the analysis of the first transfer function may include comparing the first transfer function to a baseline transfer function associated with a defect-free railroad track. One or more defects may be determined to be present in the railroad track based at least on one or more differences between the first transfer function and the baseline transfer function.

In some variations, the analysis of the first transfer function may include: generating a feature vector that includes at least one feature associated with the first transfer function; and comparing the feature vector to a plurality of baseline feature vectors of transfer functions associated with defect-free railroad tracks, the comparison determining how much the first transfer function deviates from the transfer functions associated with the defect-free railroad tracks. The comparison may include a principal component analysis, factor analysis, cluster analysis, linear discriminant analysis, mean-square-error analysis, Euclidean distance analysis, and/or a Mahalanobis distance analysis.

In some variations, the apparatus may further include a third sensor and a fourth sensor. The third sensor may be configured to at least detect a third signal corresponding to a fourth response of the railroad track, at a third location on the railroad track, to the motion of the rail car wheel on the railroad track. The fourth sensor may configured to at least detect a fourth signal corresponding to a fifth response of the railroad track, at a fourth location on the railroad track, to the motion of the rail car wheel on the railroad track. The controller may be configured to generate, based at least on the third signal and the fourth signal, a second transfer function associated with a second portion of the railroad track between the third location and the fourth location. The second transfer function may correspond to a sixth response of the railroad track at the fourth location to stimuli applied at the third location. Whether the one or more defects are present in the railroad track may be determined based at least on an analysis of the first transfer function and the second transfer function. The analysis may include comparing the first transfer function and the second transfer function. The one or more defects may be determined to be present in the railroad track based at least on a mismatch between the first transfer function and the second transfer function. The analysis may include: generating a feature vector that includes at least one ratio of a feature associated with the first transfer function and a corresponding feature associated with the second transfer function; and comparing the feature vector to a plurality of baseline feature vectors of transfer functions associated with defect-free railroad tracks, the comparison determining how much the first transfer function and the second transfer function deviate from the transfer functions associated with the defect-free railroad tracks.

In some variations, the first sensor and/or the second sensor may be non-contact sensors capable of measuring the response of the railroad track without making physical contact with the railroad track.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

BRIEF DESCRIPTION OF THE DRAWING

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
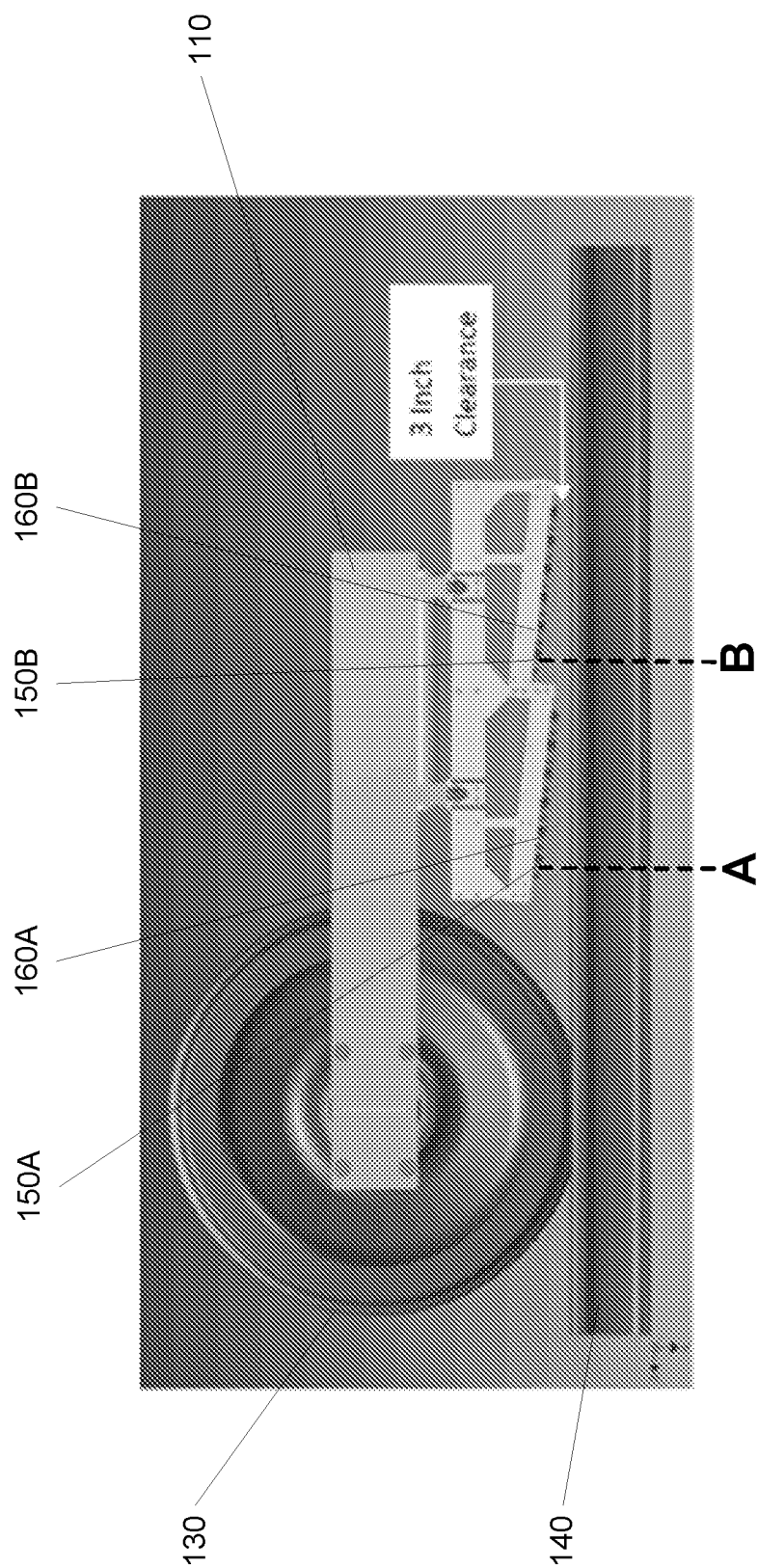
FIG. 1A depicts an example of an apparatus for ultrasonic track inspection, in accordance with some example embodiments.

Railroad track inspection may be performed by a rolling search unit (RSU), which may be a fluid filled wheel that is coupled with one or more ultrasonic transducers and ultrasonic receivers. As the rolling search unit travels over the surface of a railroad track, the ultrasonic transducers may apply stimuli at a first location along the length of the railroad track while the ultrasonic waves induced by the stimuli may be measured by the ultrasonic receivers at a second location along the length of the railroad track. As defects in the railroad track attenuate and/or reflect ultrasonic waves, changes in the ultrasonic waves observed at the second location may indicate the presence of one or more defects in the railroad track. Due to the presence of active ultrasonic transducers and a need for the fluid-filled wheel to remain in contact with the surface of the railroad track, rolling search units may only be able to perform track inspection at reduced speeds (e.g., approximately 25 miles per hour (mph)). Thus, using rolling search units to perform track inspection may require specialized inspection vehicles, which must operate on a limited schedule in order to avoid interrupting normal train traffic. Moreover, the ultrasonic transducers and ultrasonic receivers included in a typical rolling search unit may operate at frequencies (e.g., from 2.25 megahertz (MHz) to 5 MHz) that are too high to reach defects located beneath discontinuities along the surface of a railroad track.

In some example embodiments, instead of measuring ultrasonic waves that have been actively induced by one or more ultrasonic transducers in a rolling search unit, a passive inspection of a railroad track may be performed by measuring the response of the railroad track to the motion of train wheels along the railroad track, for example, during the standard operation of a rail car. The response of the railroad track may include waves propagating through the railroad track including, for example, acoustic waves, ultrasonic waves, and/or the like, that have a much lower frequency (e.g., approximately 100 kilohertz (kHz)) than waves that are actively induced by ultrasonic transducers. As such, unlike conventional techniques for track inspection (e.g., rolling search units) that rely on high frequency ultrasonic waves, passive track inspection may be capable of detecting defects obscured by surface discontinuities. Moreover, by obviating active ultrasonic transducers, passive track inspection may be performed at significantly higher speeds (e.g., up to 100 miles per hour) than conventional track inspection techniques.

In some example embodiments, at least one pair of sensors may be deployed to measure the response of the railroad track to the motion of train wheels along the railroad track. For example, a first sensor may detect a first signal corresponding to the response of the track at a first location along the length of the track. Meanwhile, a second sensor may detect a second signal corresponding to the response of the track at a second location along the length of the track. The first signal and the second signal may be processed, for example, through normalization and cross correlation, deconvolution, and/or the like, to generate a transfer function such as, for example, a Green's function and/or the like. The transfer function may represent a time-varying response at the second location to time-varying stimuli at the first location. That is, the transfer function may represent a wave that is analogous to a wave that is induced in the track by stimuli from an active ultrasonic transducer. Defects in the railroad track between the first location and the second location may distort the transfer function by attenuating the waves propagating from the first location to the second location. Accordingly, defects that may be present in the railroad track between the first location and the second location may be determined based on any analysis of the transfer function.

FIG. 1A depicts an example of an apparatus 110 for ultrasonic track inspection, in accordance with some example embodiments. FIG. 1C depicts a placement of the apparatus 110 for ultrasonic track inspection, in accordance with some example embodiments. Referring to FIGS. 1A and 1C, the apparatus 110 may be deployed on a rail car 120. As shown in FIG. 1C, the apparatus 110 may be coupled with a wheel 130 of the rail car 120 and/or disposed at a location proximate to the wheel 130. During operation of the rail car 120, the apparatus 110 may measure a response of a track 140 to the motion of the wheel 130 as the wheel 130 travels over a surface of the track 140. In some example embodiments, defects that are present in the track 140 may be detected based at least on the response of the track 140 to the motion of the wheel 130.

Referring again to FIG. 1A, the apparatus 110 may include at least one pair of sensors. For example, the apparatus 110 may include a first pair of sensors that includes, for example, a first sensor 150A and a second sensor 150B. The apparatus 110 may also include additional pairs of sensors including, for example, a second pair of sensors that includes a third sensor 160A and a fourth sensor 160B. It should be appreciated that the first sensor 150A, the second sensor 150B, the third sensor 160A, and/or the fourth sensor 160B may be any type of ultrasonic receivers. According to some example embodiments, the first sensor 150A, the second sensor 150B, the third sensor 160A, and/or the fourth sensor 160B may be non-contact sensors capable of measuring the response of the track 140 without being in contact with the track 140. The use of non-contact sensors that minimize and/or prevent physical contact with the track 140 may improve ultrasonic track inspection, for example, by increasing the maximum speed at which the inspection may be performed. However, it should be appreciated that the apparatus 110 may include any type of sensors including, for example, contact sensors.

Figure 1B:
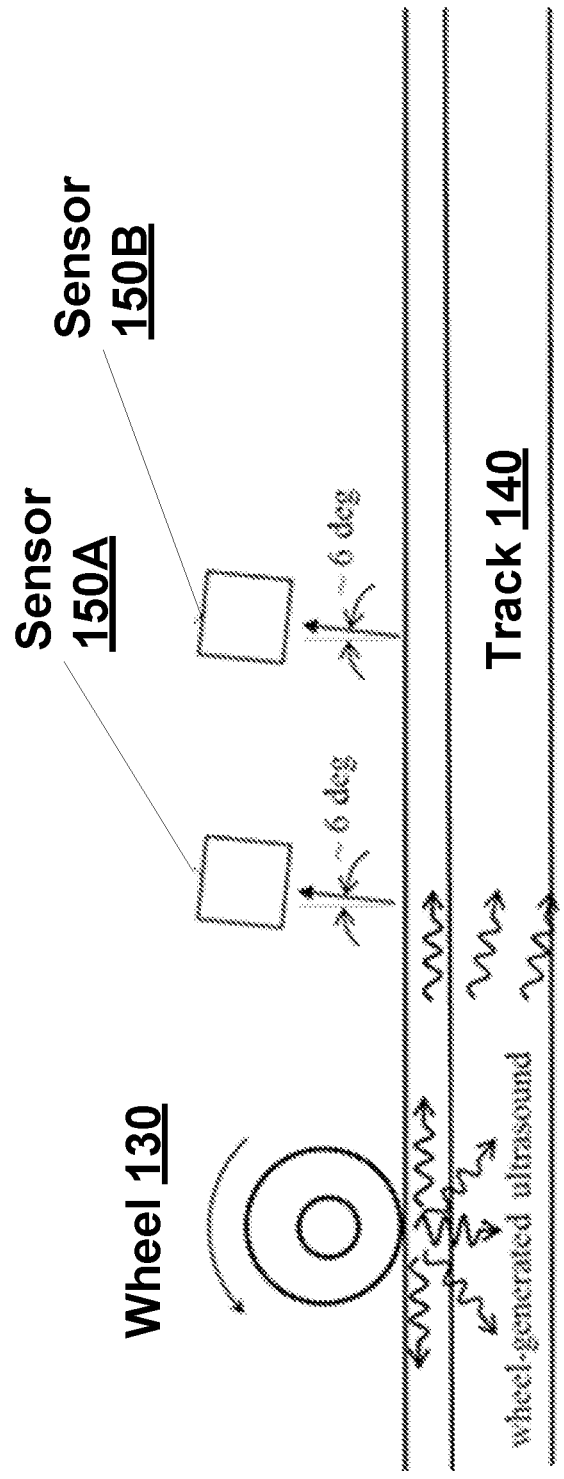
FIG. 1B depicts an example of sensors for ultrasonic track inspection, in accordance with some example embodiments.
Figure 1C:
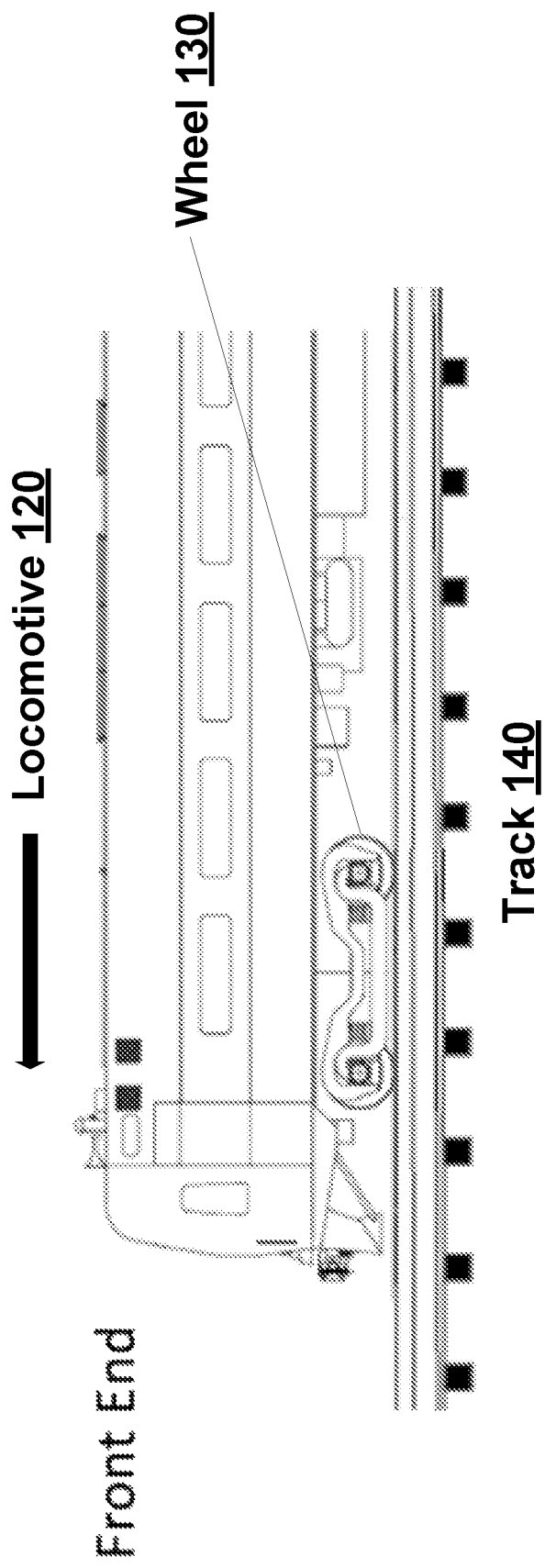
FIG. 1C depicts a placement of an apparatus for ultrasonic track inspection, in accordance with some example embodiments.

FIG. 1B depicts an example of the first sensor 150A and/or the second sensor 150B for ultrasonic track inspection, in accordance with some example embodiments. In some example embodiments, the first sensor 150A and/or the second sensor 150B may be non-contact sensors including, for example, air-coupled transducers (e.g., piezoelectric and/or capacitive), electro-mechanical acoustic transducers (EMATs), laser interferometers, laser vibrometers, and/or the like. As shown in FIG. 1B, the first sensor 150A and/or the second sensor 150B may be elevated (e.g., at least 2-3 inches) off the surface of the track 140. Moreover, to maximize the sensitivity, the first sensor 150A and/or the second sensor 150B may be oriented, in accordance to Snell's law, at a certain angle (e.g., approximately 6 degrees) from a vertical axis of the track 140.

Figure 1D:
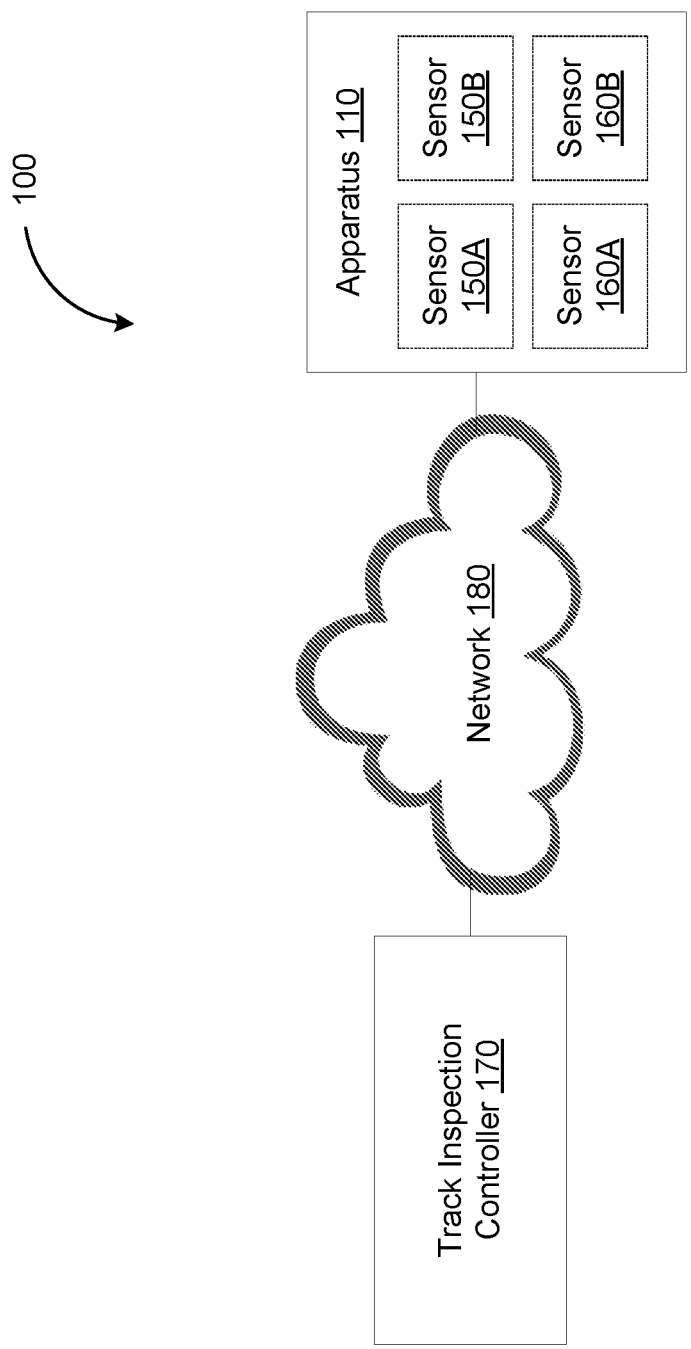
FIG. 1D depicts a system diagram illustrating a system for ultrasonic track inspection, in accordance with some example embodiments.

FIG. 1D depicts a system diagram illustrating system 100 for ultrasonic track inspection. Referring to FIGS. 1A-D, the apparatus 110 may be communicatively coupled with a track inspection controller 170 via a network 180. The network 180 may be any wired and/or wireless network including, for example, a public land mobile network (PLMN), a wide area network (WAN), a local area network (LAN), a virtual local area network (VLAN), the Internet, and/or the like. Although FIG. 1D shows the apparatus 110 as being remote to and/or detached from the track inspection controller 170, it should be appreciated that the track inspection controller 170 may be coupled with and/or integrated into the apparatus 110. For example, the apparatus 110 may include software and/or hardware for implementing at least some of the functionalities of the track inspection controller 170.

In some example embodiments, where the apparatus 110 is remove to and/or detached from the track inspection controller 170, the apparatus 110 may include one or more transceivers configured to establish a long-range connection (e.g., cellular, WiFi, and/or the like) and/or a short-range connection (e.g., Bluetooth, near field communication (NFC), and/or the like) with the track inspection controller 170. Here, data corresponding to the response of the track 140 to the motion of the wheel 130 may be sent from the apparatus 110 to the track inspection controller 170 via the network 180 via either a wired and/or a wireless connection. The data from the apparatus 110 may include, for example, data collected by one or more pairs of the sensors included in the apparatus 110 including, for example, data collected by the first sensor 150A and the second sensor 150B, and/or data collected the third sensor 160A, and the fourth sensor 160B. The track inspection controller 180 may be configured to process the data received from the apparatus 110. Moreover, the track inspection controller 180 may detect, based on the processed data received from the apparatus 110, defects that may be present in the track 140 including, for example, cracks and/or the like.

Referring again to FIG. 1B, in some example embodiments, the first sensor 150A and the second sensor 150B may perform separate measurements of the response of the track 140 to the motion of the wheel 130. For example, the first sensor 150A may detect a first signal $V_A$ corresponding to the response of the track 140, at a first location A on the track 140, to the motion of the wheel 130 over the surface of the track 140. Meanwhile, the second sensor 150B may detect a second signal $V_B$ corresponding to the response of the track 140, at a second location B on the track 140, to the motion of the wheel 130 over the surface of the track 140.

The first signal $V_A$ that is measured by the first sensor 150A at the first location A on the track 140 may be expressed as Equation (1) below:

$$V_A(\omega)=W(\omega)\cdot WA(\omega)\cdot R(\omega) \quad (1)$$

wherein $W(\omega)$ may denote a transfer function associated with the wheel 130, $WA(\omega)$ may denote a transfer function associated with a portion of the track 140 between the wheel 130 and the first location A, and $R(\omega)$ may denote a transfer function associated with the first sensor 150A. As Equation (1) indicates, the first signal $V_A$ may be a product of the transfer functions $W(\omega)$, $WA(\omega)$, and $R(\omega)$. As used herein, a transfer function may refer to a function that relates an output and/or a response of a system (e.g., the wheel 130, the track 140 and/or any portion thereof, the first sensor 150A, the second sensor 150B, and/or the like) to an input and/or a stimulus to the system.

Meanwhile, the second signal $V_B$ that is measured by the second sensor 150B may be expressed as Equation (2) below:

$$V_B(\omega)=W(\omega)\cdot WA(\omega)\cdot G_{AB}(\omega)\cdot R(\omega) \quad (2)$$

wherein $G_{AB}(\omega)$ may denote a transfer function associated a portion of the track 140 between the first location A and the second location B. The transfer function $G_{AB}(\omega)$ may express the time-varying response of the track 140 at the second location B to the time-varying stimuli applied to the track 140 at the first location A. Meanwhile, $R(\omega)$ may also denote the transfer function associated with the second receiver 150B. The second sensor 150B may have a same frequency response as the first sensor 150A if the two sensors are identical. As such, the same transfer function $R(\omega)$ may apply to both the first sensor 150A and the second sensor 150B. However, it should be appreciated that the first sensor 150A and the second sensor 150B may also be associated with different transfer functions reflective of differences in the frequency response of the first sensor 150A and the frequency response of the second sensor 150B.

Figure 2:
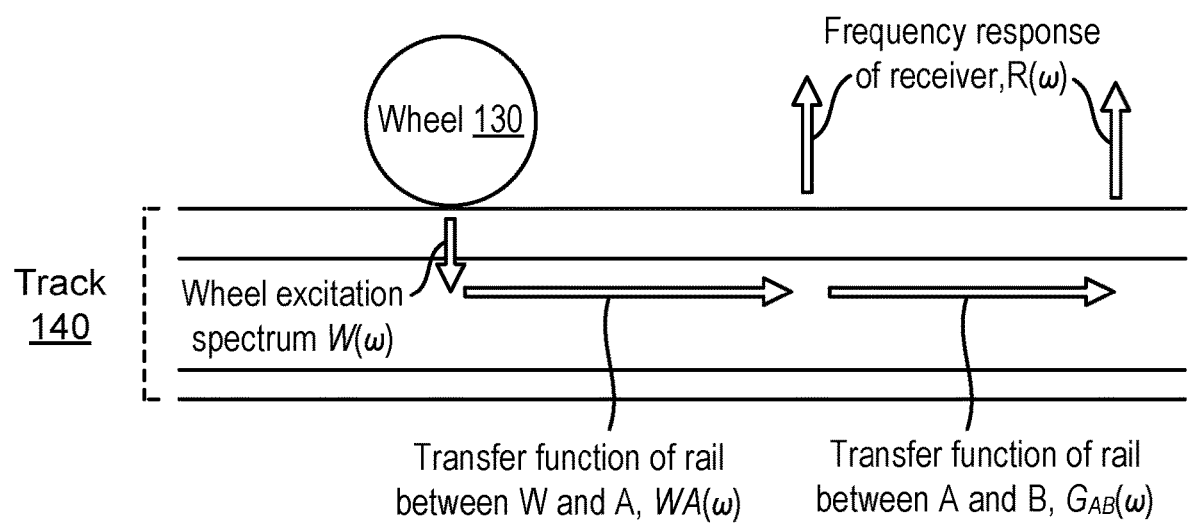
FIG. 2 depicts the various transfer functions associated ultrasonic track inspection, in accordance with some example embodiments.

To further illustrate, FIG. 2 depicts the various transfer function associated with ultrasonic track inspection, in accordance with some example embodiments. Referring to FIG. 2, the transfer function $W(\omega)$ may express the time-varying response of the wheel 130 (e.g., the excitation spectrum) to time-varying stimuli applied to the wheel 130. Meanwhile, the transfer function $R_A(\omega)$ may correspond to the time-varying response of the first sensor 150A while the transfer function $R_B(\omega)$ may correspond to the time-varying frequency response of the second sensor 150B. The transfer function $WA(\omega)$ may correspond to the time-varying response of the track 140 at the first location A to time-varying stimuli applied at a location of contact between the wheel 130 and the track 140. The transfer function $G_{AB}(\omega)$ may describe the time-varying response of the track 140 at the second location B to time-varying stimuli applied at the first location A.

The first signal $V_A$ and the second signal $V_B$ may each correspond to the response that is triggered by the motion of the wheel 130 on the surface of the track 140. As such, the first signal $V_A$ and the second signal $V_B$, in their raw state as initially measured by the first sensor 150A and the second sensor 150B, may be random and bear no relationship to one another. In order to reconstruct the transfer function $G_{AB}$, the first signal $V_A$ and the second signal $V_B$ may be processed, for example, by the track inspection controller 170, to remove noise and reconstruct a coherent relationship between the two signals. For example, the first signal $V_A$ and the second signal $V_B$ may initially be in the time domain t and measuring a change in the amplitude of an electric signal (e.g., voltage) over time. As such, the first signal $V_A$ and the second signal $V_B$ may each be subject to a Fast Fourier Transform (FFT) in order to convert the first signal $V_A$ and the second signal $V_B$ from the time domain t to a frequency domain w. Moreover, the first signal $V_A$ and the second signal $V_B$ may be cross-correlated and normalized in order to reconstruct the transfer function $G_{AB}$. Alternatively and/or additionally, the first signal $V_A$ and the second signal $V_B$ may be deconvoluted in order to reconstruct the transfer function $G_{AB}$.

To further illustrate, the cross-correlation $Xcorr_{AB}$ of the first signal $V_A$ and the second signal $V_B$ in the frequency domain w may be expressed by Equation (4) below:

$$Xcorr_{AB}(\omega)=V_A{}^*(\omega)\cdot V_B(\omega) \quad (3)$$

wherein the asterisk symbol * may denote a complex conjugate. It should be appreciated that cross-correlating the first signal $V_A$ and the second signal $V_B$ may determine a measure of similarity between the first signal $V_A$ and the second signal $V_B$ as a function of a displacement of the first signal $V_A$ relative to the second signal $V_B$. As used herein, the cross-correlation $Xcorr_{AB}$ of the first signal $V_A$ and the second signal $V_B$ may include a sliding dot product and/or a sliding inner product of the first signal $V_A$ and the second signal $V_B$.

To derive the transfer function $G_{AB}$, Equations (1) and (2) may be substituted, where appropriate, into Equation (3) to yield the following Equation (4).

$$Xcorr_{AB}(\omega) = W^*(\omega)\cdot WA^*(\omega)\cdot R^*(\omega)\cdot W(\omega)\cdot WA(\omega)\cdot G_{AB}(\omega)\cdot R(\omega) \quad (4)$$
$$= |W(\omega)|^2 \cdot |WA(\omega)|^2 \cdot |R(\omega)|^2 \cdot G_{AB}(\omega)$$

wherein | | may denote a modulus operation such that $|\ |^2$ may represent auto-correlations because $Autocorr(\omega)=F^*(\omega)\cdot F(\omega)=|F(\omega)|^2$, which may physically correspond to the energy spectrum of the function F.

The transfer function $G_{AB}(\omega)$ included in Equation (4) may still be scaled by the transfer function $W(\omega)$ of the wheel 130, the transfer function $WA(\omega)$ of the portion of the track 140 between the wheel 130 and the first location A, and the transfer function $R(\omega)$ of the first sensor 150A and/or the second sensor 150B. In order to eliminate these extraneous transfer functions, Equation (4) may be normalized with an autocorrelation of either Equation (1) or Equation (2). Equation (5) below may express the normalized cross-correlation $NormXcorr_{AB}$ of the first signal $V_A$ and the second signal $V_B$ in the frequency domain co using the autocorrelation of Equation (1):

$$NormXcorr_{AB}(\omega) = \frac{Xcorr_{AB}(\omega)}{Autocorr_A(\omega)} = \frac{|W(\omega)|^2 \cdot |WA(\omega)|^2 \cdot |R(\omega)|^2 \cdot G_{AB}(\omega)}{|W(\omega)|^2 \cdot |WA(\omega)|^2 \cdot |R(\omega)|^2} = G_{AB}(\omega) \quad (5)$$

Alternatively and/or additionally, Equation (6) below may express the normalized cross-correlation $NormXcorr_{AB}$ of the first signal $V_A$ and the second signal $V_B$ in the frequency domain co using the autocorrelation of Equation (2):

$$NormXcorr_{AB}(\omega) = \qquad (6)$$
$$\frac{Xcorr_{AB}(\omega)}{Autocorr_B(\omega)} = \frac{|W(\omega)|^2 \cdot |WA(\omega)|^2 \cdot |R(\omega)|^2 \cdot G_{AB}(\omega)}{|W(\omega)|^2 \cdot |WA(\omega)|^2 \cdot |R(\omega)|^2 \cdot |G_{AB}(\omega)|^2} = \frac{G_{AB}(\omega)}{|G_{AB}(\omega)|^2}$$

Normalizing the cross-correlation NormXcorr$_{AB}$ of the first signal V$_A$ and the second signal V$_B$ using the autocorrelation of Equation (1) may yield the transfer function G$_{AB}$(ω) of the portion of the track between the first location A and the second location B. By contrast, normalizing the cross-correlation NormXcorr$_{AB}$ of the first signal V$_A$ and the second signal V$_B$ using the autocorrelation of Equation (2) may yield the transfer function G$_{AB}$(ω) as scaled by an autocorrelation of the transfer function G$_{AB}$(ω) which, as noted, may correspond to the energy spectrum of the transfer function G$_{AB}$(ω). As noted, the transfer function G$_{AB}$(ω) may describe the time-varying response at the second location B to time-varying stimuli applied at the first location A.

It should be appreciated that the division operations in Equations (5) and (6) may lead to numerically unstable results (e.g., undefined numbers), for example, when the denominator of the division operation approaches zero. This may occur with notch frequency and/or outside-bandwidth frequencies. In order to overcome this numerical instability, the denominators in Equations (5) and (6) may be required to assume a finite value by adding a term ε as shown in Equation (7) below.

$$NormXcorr_{AB}(\omega) = \frac{Xcorr_{AB}(\omega)}{Autocorr_A(\omega) + \varepsilon} \text{ or } \frac{Xcorr_{AB}(\omega)}{Autocorr_B(\omega) + \varepsilon} \qquad (7)$$

wherein ε may be set to a certain percentage (e.g., 10%) of the average energy spectrum A|V$_A$(ω)| of the first signal V$_A$ measured at the first location A of the track 140 and/or the average energy spectrum A|V$_B$(ω)| of the second signal V$_B$ measured at the second location B of the track 140.

In some example embodiments, instead of and/or in addition to normalizing and cross-correlating the first signal V$_A$ and the second signal V$_B$ to derive the transfer function G$_{AB}$(ω), the first signal V$_A$ and the second signal V$_B$ may be subject to deconvolution in order to derive the transfer function G$_{AB}$(ω). The deconvolution Deconv$_{BA}$(ω) of the first signal V$_A$ and the second signal V$_B$ may be performed in the frequency domain and may be expressed by Equation (8) below:

$$Deconv_{BA}(\omega) = \frac{V_B(\omega)}{V_A(\omega)} \qquad (8)$$

Substituting Equations (1) and (2) into Equation (8) may yield Equation (9) below:

$$Deconv_{BA}(\omega) = \frac{W(\omega) \cdot WA(\omega) \cdot G_{AB}(\omega) \cdot R(\omega)}{W(\omega) \cdot WA(\omega) \cdot R(\omega)} = G_{AB}(\omega) \qquad (9)$$

As Equation (9) shows, the transfer function G$_{AB}$(ω) may be reconstructed by as a ratio of the second signal V$_B$ measured at the second location B of the track 140 relative to the first signal V$_A$ measured at the first location A of the track 140.

Alternatively and/or additionally, the deconvolution Deconv$_{BA}$(ω) of the first signal V$_A$ and the second signal V$_B$ in the frequency domain may also be performed in accordance with Equation (10) below:

$$Deconv_{BA}(\omega) = \qquad (10)$$
$$\frac{V_A(\omega)}{V_B(\omega)} = \frac{W(\omega) \cdot WA(\omega) \cdot R(\omega)}{W(\omega) \cdot WA(\omega) \cdot G_{AB}(\omega) \cdot R(\omega)} = \frac{1}{G_{AB}(\omega)} = \frac{G_{AB}^*(\omega)}{|G_{AB}(\omega)|^2}$$

As shown in Equation (10), the transfer function G$_{AB}$(ω) may also be reconstructed as a ratio of the first signal V$_A$ measured at the first location A of the track 140 relative to the second signal V$_B$ measured at the second location B of the track 140. Deconvoluting in this manner may generate a time-reversed transfer function G$_{AB}$(ω) that has been scaled by its own energy spectrum, as represented by the autocorrelation |G$_{AB}$(ω)|$^2$ of the transfer function G$_{AB}$(ω).

According to some example embodiments, defects in the track 140, for example, between the first location A and the second location B, may be detected based on the transfer function G$_{AB}$(ω). For instance, the transfer function G$_{AB}$(ω) may be converted from the frequency domain co back into the time domain t by an Inverse Fast Fourier Transform (IFFT) as expressed in Equation (11) below:

$$G_{AB}(t) = \frac{1}{2\pi} \int_{-\infty}^{\infty} G_{AB}(\omega) e^{-i\omega t} d\omega \qquad (11)$$

Figure 3:
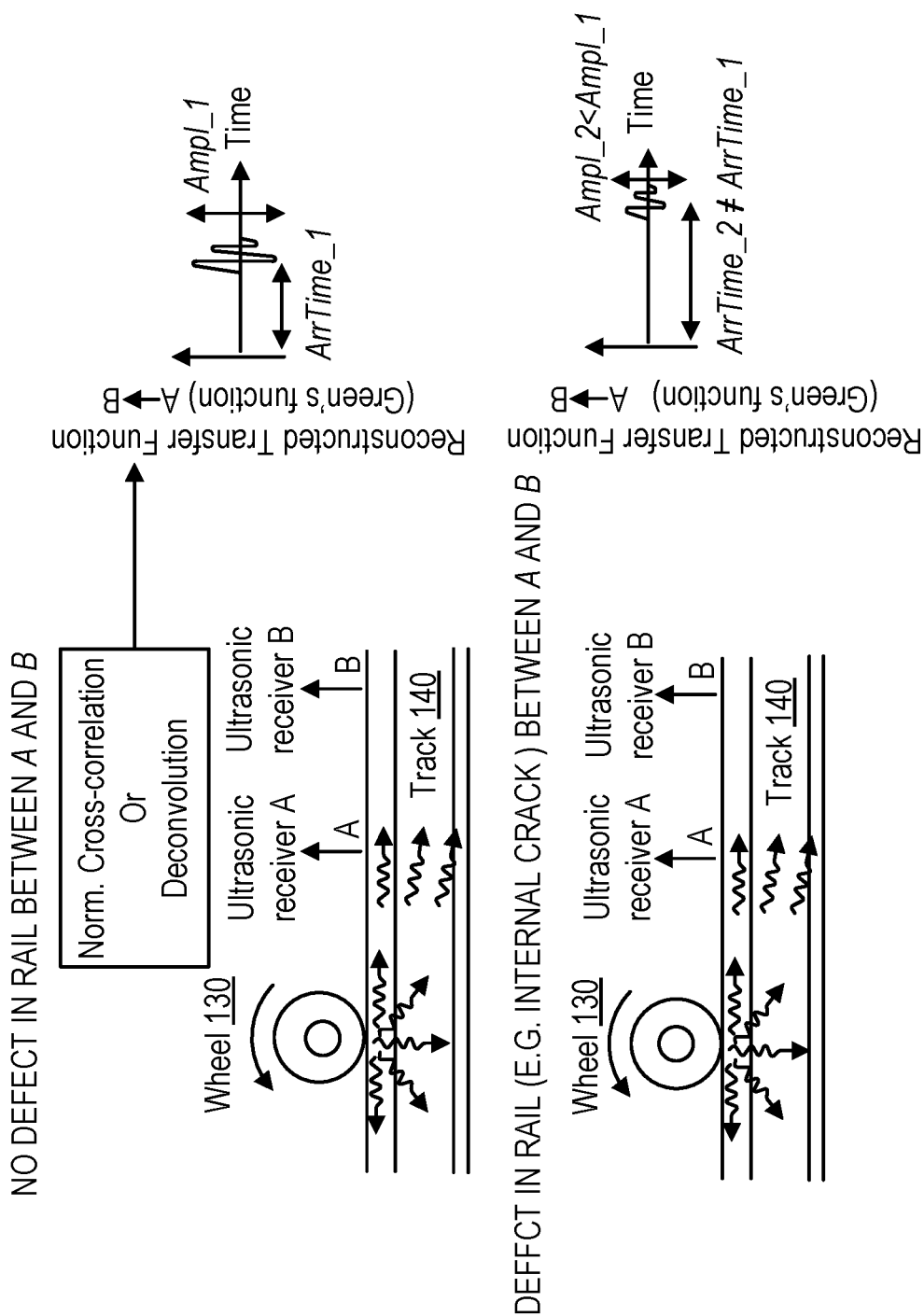
FIG. 3 depicts a detection of track defects based on a transfer function, in accordance with some example embodiments.

As noted, defects in the track 140 may distort the waves (e.g., acoustic waves, ultrasonic waves, and/or the like) traveling through the track 140, for example, by scattering, refracting, and/or reflecting the waves. Accordingly, the track inspection controller 170 may detect defects in the track 140 based on the transfer function G$_{AB}$(t). For example, changes (e.g., drops) in the amplitude of the transfer function G$_{AB}$(t) may indicate the presence of defects in the tracks 140 including, for example, cracks and/or the like. To further illustrate, FIG. 3 depicts a detection of track defects based on the transfer function G$_{AB}$(t), in accordance with some example embodiments. As shown in FIG. 3, in some example embodiments, defects in the track 140 may be detected based on a comparison between the transfer function G$_{AB}$(t) and a baseline transfer function G$_B$(t) associated with a track that is free from defects. Any difference between the transfer function G$_{AB}$(ω) and the baseline transfer function G$_B$(t) including, for example, a difference in arrival time, amplitude, and/or the like, may indicate the presence of defects (e.g., cracks and/or the like) in the track 140.

Alternatively and/or additionally, defects in the track 140 may be detected based on a statistical analysis of the transfer function G$_{AB}$(t) that assesses the transfer function G$_{AB}$(t) relative to the statistical norm for a defect-free track. To further illustrate, FIG. 4 depicts a statistical analysis of the transfer function G$_{AB}$(t) in accordance with some example embodiments.

Figure 4:
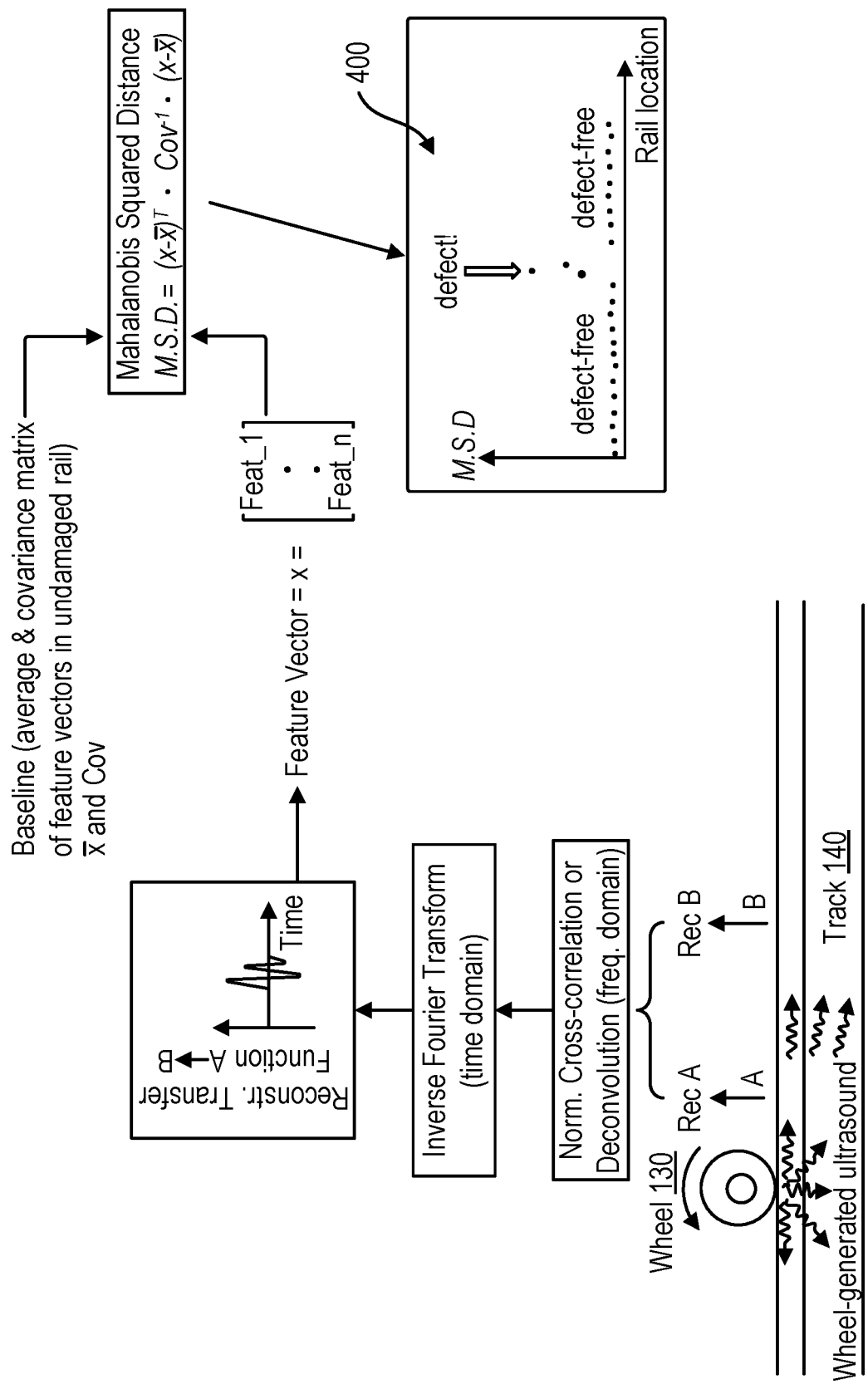
FIG. 4 depicts a statistical analysis of a transfer function for detecting track defects, in accordance with some example embodiments.

As shown in FIG. 4, a statistical analysis of the transfer function G$_{AB}$(t) may be performed based on a feature vector x of the transfer function G$_{AB}$(t). The feature vector x, as shown in Equation (12) below, may include an n quantity of features. It should be appreciated that increasing the quantity of features included in the vector x may improve the sensitivity of the statistical analysis.

$$x = \begin{bmatrix} \text{Feature}_1 \\ \vdots \\ \text{Feature}_2 \end{bmatrix} \quad (12)$$

The feature vector x may be formed by extracting, from the transfer function $G_{AB}(t)$, one or more features including, for example, a root-mean square of an amplitude of the transfer function $G_{AB}(t)$, a variance in the amplitude of the transfer function $G_{AB}(t)$, a cross-correlation value of the amplitude of the transfer function $G_{AB}(t)$, the auto-correlation value of the amplitude of the transfer function $G_{AB}(t)$, a peak-to-peak value of the amplitude of the transfer function $G_{AB}(t)$, a peak value of the amplitude of the transfer function $G_{AB}(t)$, a Kurtosis value of the transfer function $G_{AB}(t)$, a time domain statistical measurement of the properties of the transfer function $G_{AB}(t)$, a frequency domain statistical measurement of the properties of the transfer function $G_{AB}(t)$, and/or the like. It should be appreciated that the values of the features extracted from the transfer function $G_{AB}(t)$ may or may not be normalized before being included in the feature vector x. Moreover, as used herein, the Kurtosis value of the transfer function $G_{AB}(t)$ may be a measure of the peakedness of the signal. A higher Kurtosis value may indicate a larger variance in the transfer function $G_{AB}(t)$ due to infrequent extreme deviations.

Referring again to FIG. 4, in some example embodiments, the statistical analysis of the transfer function $G_{AB}(t)$ may be performed by comparing the feature vector x to a collection of baseline feature vectors of transfer functions associated with defect-free tracks. The collection of baseline feature vectors may represent the statistical norm of transfer functions associated with defect-free tracks. Meanwhile, the comparison may include an outlier analysis, discordancy test, and/or anomaly detection that determines how much the transfer function $G_{AB}(t)$ deviates from the statistical norm for a defect-free track. For instance, the deviation between the transfer function $G_{AB}(t)$ deviates from the statistical norm for a defect-free track may be determined by performing a principal component analysis, factor analysis, cluster analysis, linear discriminant analysis, mean-square-error analysis, Euclidean distance analysis, a Mahalanobis distance analysis, and/or the like. One or more defects may be present in the track 140 if the deviation between the transfer function $G_{AB}(t)$ and the statistical norm for a defect-free track exceeds a threshold.

For example, to determine whether defects are present in the track 140 (e.g., between the first location A and the second location B), the track inspection controller 170 may determine, in accordance with Equation (13) below, a Mahalanobis Squared Distance M.S.D. between the feature vector x and the collection of baseline feature vectors.

$$M.S.D. = (x-\bar{x})^T \cdot Cov^{-1} \cdot (x-\bar{x}) \quad (13)$$

wherein $\bar{x}$ may denote a mean of the baseline feature vectors, Cov may denote a covariance matrix of the baseline feature vectors, T may denote the transpose matrix operation, and −1 may denote an inverse matrix operation. In some example embodiments, the track inspection controller 170 may determine that defects are present in the track 140 (e.g., between the first location A and the second location B) if the Mahalanobis Squared Distance M.S.D. exceeds a threshold value. It should be appreciated that this threshold value may be selected to exceed a certain level of statistical confidence that the feature vector x is outside the statistical norm represented by the collection of baseline feature vectors.

In some example embodiments, the track inspection controller 170 may determine multiple Mahalanobis Squared Distance M.S.D. values for different locations along the track 140. As graph 400 in FIG. 4 shows, these Mahalanobis Squared Distance M.S.D. values may be recorded as a function of the location of the apparatus 110 as the apparatus travels along the length of the track 140. Thus, the graph 400 may provide visual indications of the locations along the track 140 at which defects may be present.

Figure 5:
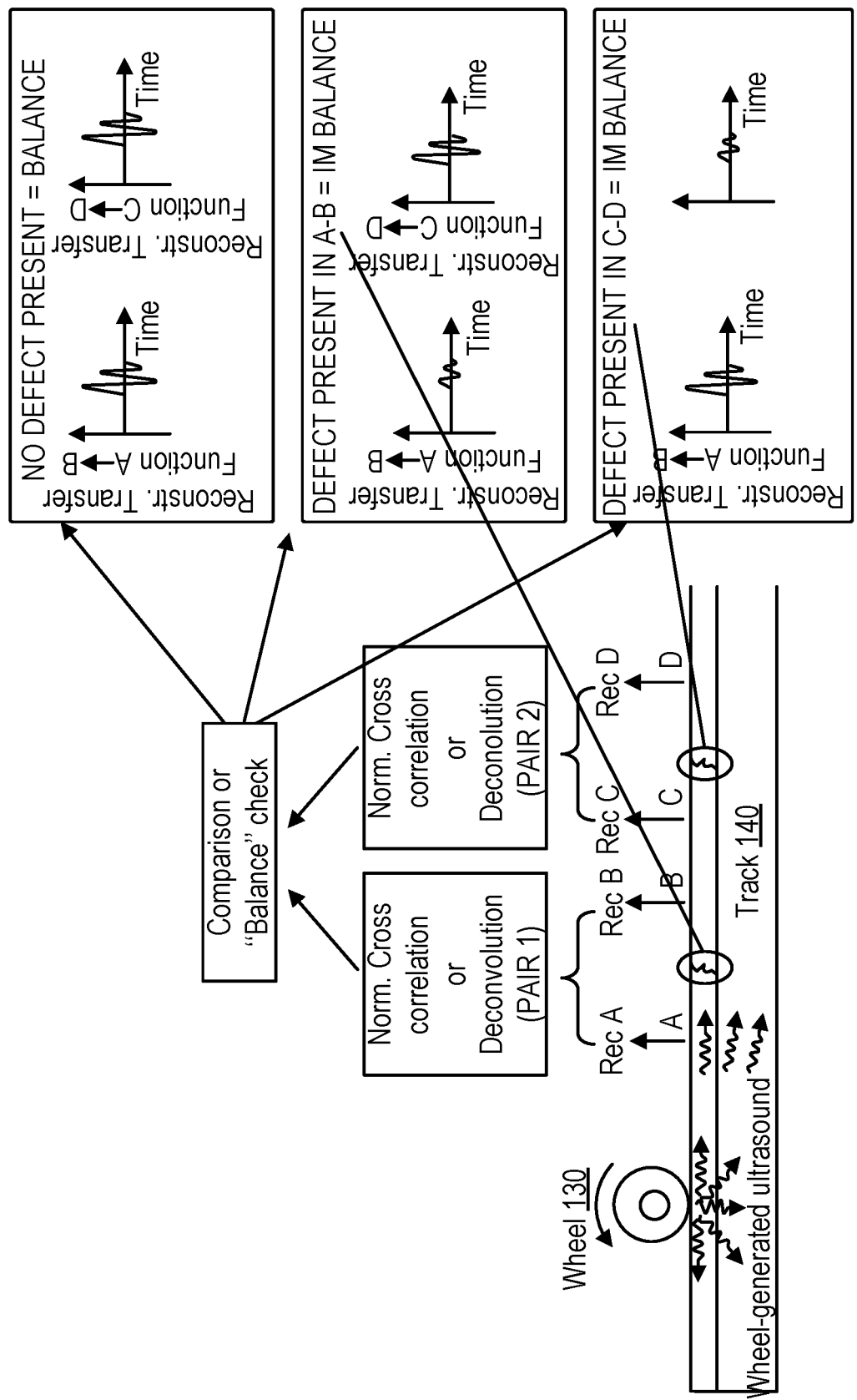
FIG. 5 depicts a differential technique for detecting track defects, in accordance with some example embodiments.

The transfer function $G_{AB}$ may be associated with instabilities that arise from the type of the track 140, conditions along the track 140 (e.g., geometry, wear and tear, surface roughness, and/or the like), and/or the condition of the wheel 130 (speed, wear and tear, geometry, load, and/or the like). To minimize the effects of these instabilities on track inspection, a differential technique may be applied in order to detect defects in the track 140. To further illustrate, FIG. 5 depicts a differential technique for ultrasonic track inspection, in accordance with some example embodiments. Referring to FIG. 5, defects in the track 140 may be detected based on the transfer function $G_{AB}$ and at least one other transfer function $G_{CD}$. The transfer function $G_{AB}$ may be generated based on data collected by the first sensor 150A and the second sensor 150B that correspond to the response of the track 140 to the motion of the wheel 130 traveling between the first location A and the second location B along the track 140. Meanwhile, the transfer function $G_{CD}$ may be generated based on data collected by a different pair of sensors positioned at a different location than the first sensor 150A and the second sensor 150B. As such, the transfer function $G_{CD}$ may be generated on data corresponding to the response of the track 140 to the motion of the wheel 130 traveling between a third location C and a fourth location D along the track 140.

As noted, the transfer function $G_{AB}$ may correspond to the time-varying response of the track 140 at the second location B to time-varying stimuli applied at the first location A. Meanwhile, the transfer function $G_{CD}$ may be determined based on a third signal $V_C$ measured at the third location C on the track 140 and a fourth signal $V_D$ measured at a fourth location D on the track 140. Accordingly, the transfer function $G_{CD}$ may correspond to a time-varying response of the track 140 at the fourth location D to time-varying stimuli applied at the third location C.

In some example embodiments, the track inspection controller 170 may perform a real-time comparison of the transfer function $G_{AB}$ and the transfer function $G_{CD}$. As shown in FIG. 5, the track inspection controller 170 may determine that no defect is present in the track 140 if the transfer function $G_{AB}$ match the transfer function $G_{CD}$. Alternatively and/or additionally, the track inspection controller 170 may determine that one or more defects are present in the track 140 if the transfer function $G_{AB}$ does not match the transfer function $G_{CD}$. It should be appreciated that defects in the track 140 may be manifest in only one transfer function at a time, thereby giving rise to variations between the transfer function $G_{AB}$ and the transfer function $G_{CD}$.

Figure 6:
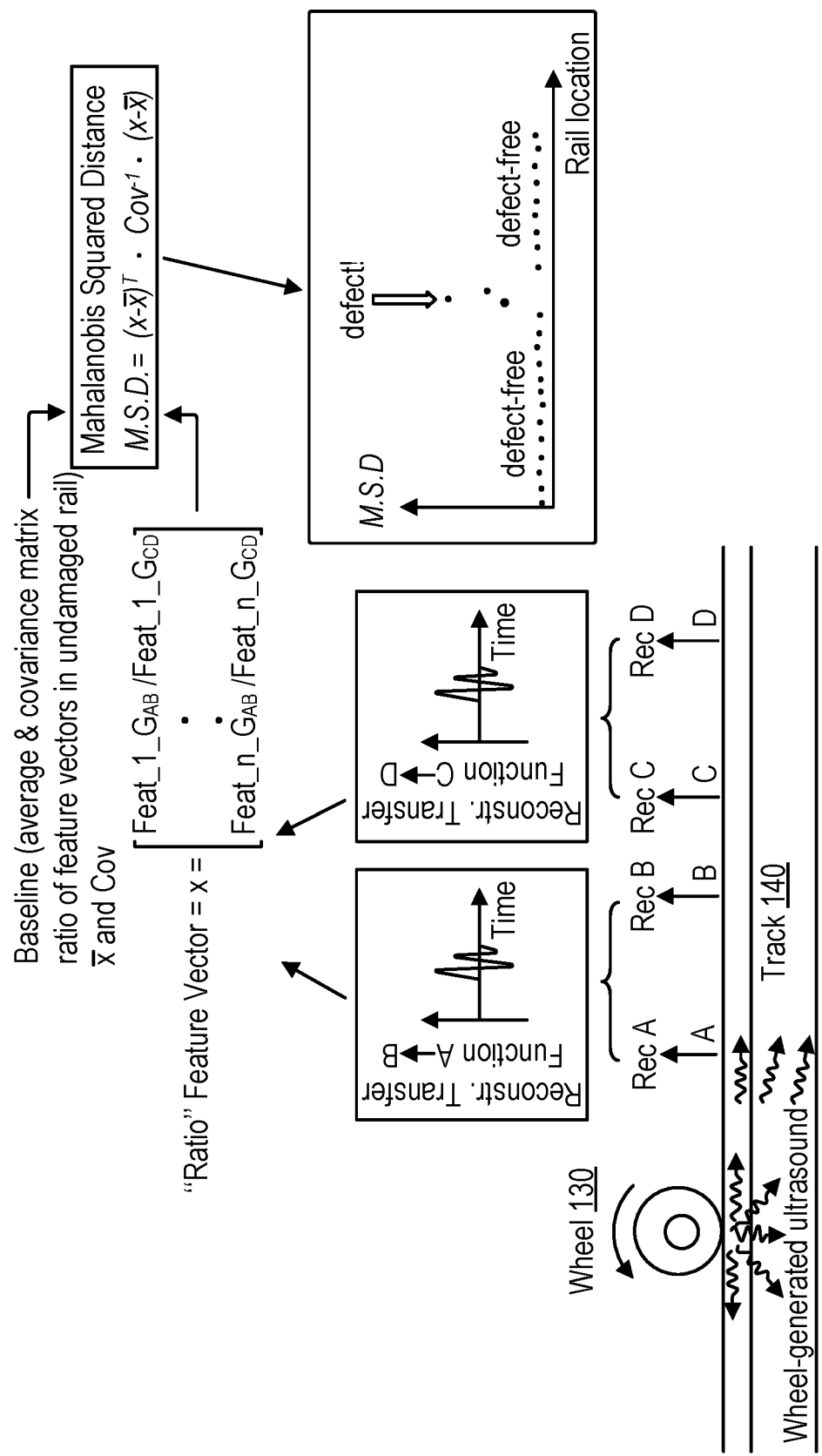
FIG. 6 depicts a statistical analysis based differential technique for detecting track defects, in accordance with some example embodiments.

In some example embodiments, the transfer function $G_{AB}$ and the transfer function $G_{CD}$ may be subject to a statistical analysis in order to determine whether defects are present in the track 140. To further illustrate, FIG. 6 depicts a statistical analysis based differential technique for detecting track defect, in accordance with some example embodiments. For example, as shown in FIG. 6, the statistical analysis of the transfer function $G_{AB}$ and the transfer function $G_{CD}$ may be performed based on a feature vector x of both the transfer function $G_{AB}$ and the transfer function $G_{CD}$. As shown in Equation (14) below, the feature vector x may be formed by extracting, from each of the transfer function $G_{AB}$ and the transfer function $G_{CD}$, an n quantity of features that include, for example, a root-mean square of the amplitude of the transfer function, a variance in the amplitude of the transfer function, a cross-correlation value of the amplitude of the transfer function, the auto-correlation value of the amplitude of the transfer function, a peak-to-peak value of the amplitude of the transfer function, a peak value of the amplitude of the transfer function, a Kurtosis value of the transfer function, a time domain statistical measurement of the properties of the transfer function, a frequency domain statistical measurement of the properties of the transfer function, and/or the like. Moreover, as shown in Equation (14), each element in the feature vector x may be a ratio of the corresponding features from the transfer function $G_{AB}$ and the transfer function $G_{CD}$.

$$x = \begin{bmatrix} \text{Feat\_1\_}G_{AB}/\text{Feat\_1\_}G_{CD} \\ \vdots \\ \text{Feat\_n\_}G_{AB}/\text{Feat\_n\_}G_{CD} \end{bmatrix} \quad (14)$$

Referring again to FIG. 6, the statistical analysis of the transfer function $G_{AB}$ and the transfer function $G_{CD}$ may be performed by comparing the feature vector x to a collection of baseline feature vectors of transfer functions associated with defect-free tracks. The collection of baseline feature vectors may represent the statistical norm of transfer functions associated with defect-free tracks. Meanwhile, the comparison may include an outlier analysis, discordancy test, and/or anomaly detection that determines how much the ratio between the transfer function $G_{AB}$ and the transfer function $G_{CD}$ deviates from the statistical norm for a defect-free track. For instance, this deviation may be determined by performing a principal component analysis, factor analysis, cluster analysis, linear discriminant analysis, mean-square-error analysis, Euclidean distance analysis, a Mahalanobis distance analysis, and/or the like. One or more defects may be present in the track 140 if the deviation (e.g., the Mahalanobis Squared Distance M.S.D.) between ratio of the transfer function $G_{AB}$ relative to the transfer function $G_{CD}$ and the statistical norm for a defect-free track exceeds a threshold.

Figure 7:
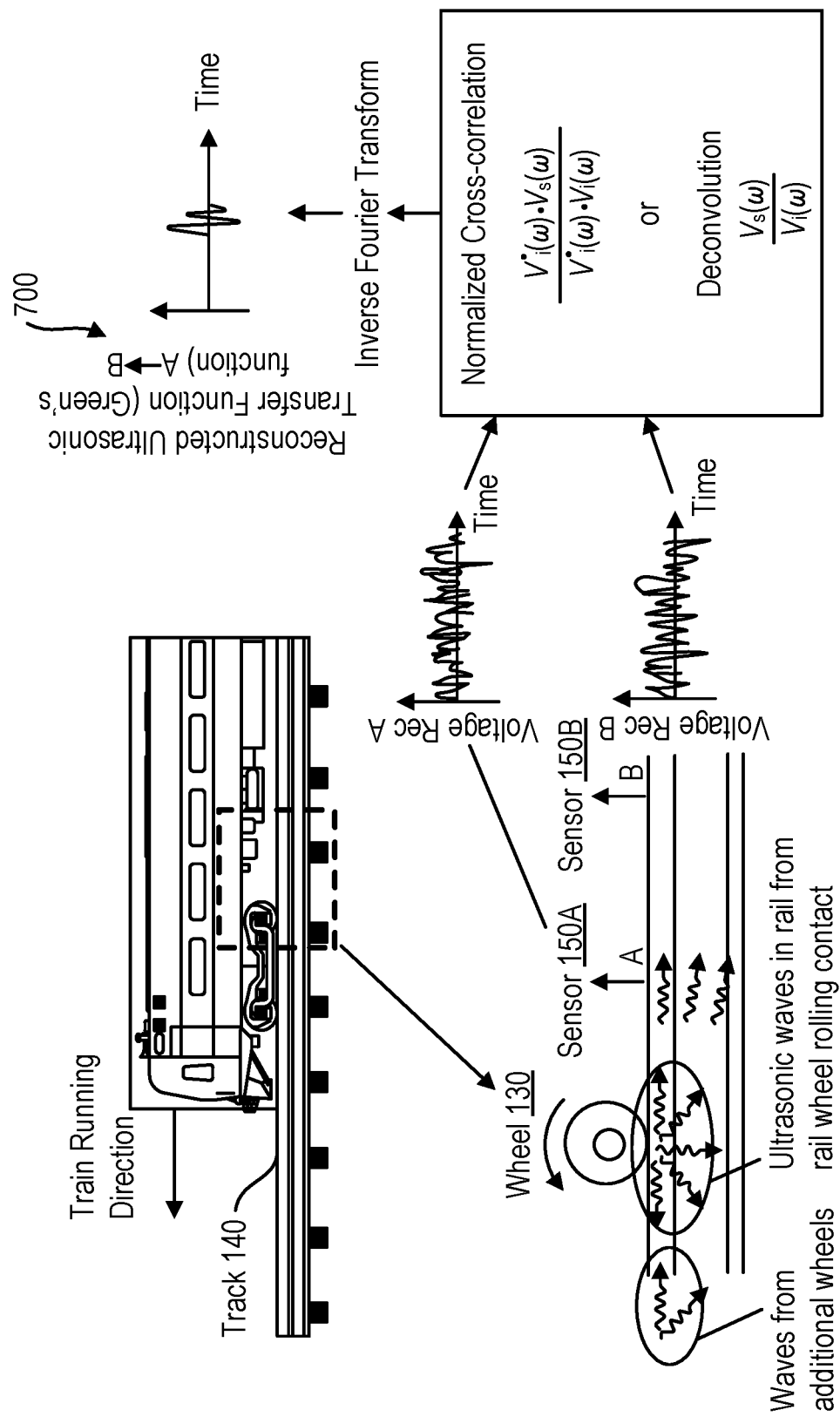
FIG. 7 depicts a process for generating a transfer function, in accordance with some example embodiments.

FIG. 7 depicts a process 700 for generating the transfer function $G_{AB}$, in accordance with some example embodiments. As shown in FIG. 7, the first sensor 150A may detect the first signal $V_A$ corresponding to the response of the track 140 at the first location A while the second sensor 150B may detect the second signal $V_B$ corresponding to the response of the track 140 at the second location B. The first signal $V_A$ and the second signal $V_B$ may be converted from a time domain into a frequency domain, for example, by applying a Fast Fourier Transform (FFT). In some example embodiments, the transfer function $G_{AB}$ may be generated by subjecting the first signal $V_A$ and the second signal $V_B$ to normalization and cross-correlation, and/or to deconvolution. The normalization and cross-correlation, and/or the deconvolution may eliminate noise and/or extraneous components such as, for example, the transfer function $W(\omega)$ of the wheel 130, the transfer function $WA(\omega)$ of the portion of the track 140 between the wheel 130 and the first location A, and the transfer function $R(\omega)$ of the first sensor 150A and/or the second sensor 150B. As shown in FIG. 7, subsequent to normalization and cross-correlation, and/or deconvolution, the transfer function $G_{AB}$ may be subject to an Inverse Fast Fourier Transform (IFFT) in order to return the transfer function $G_{AB}$ to the time domain.

Figure 8A:
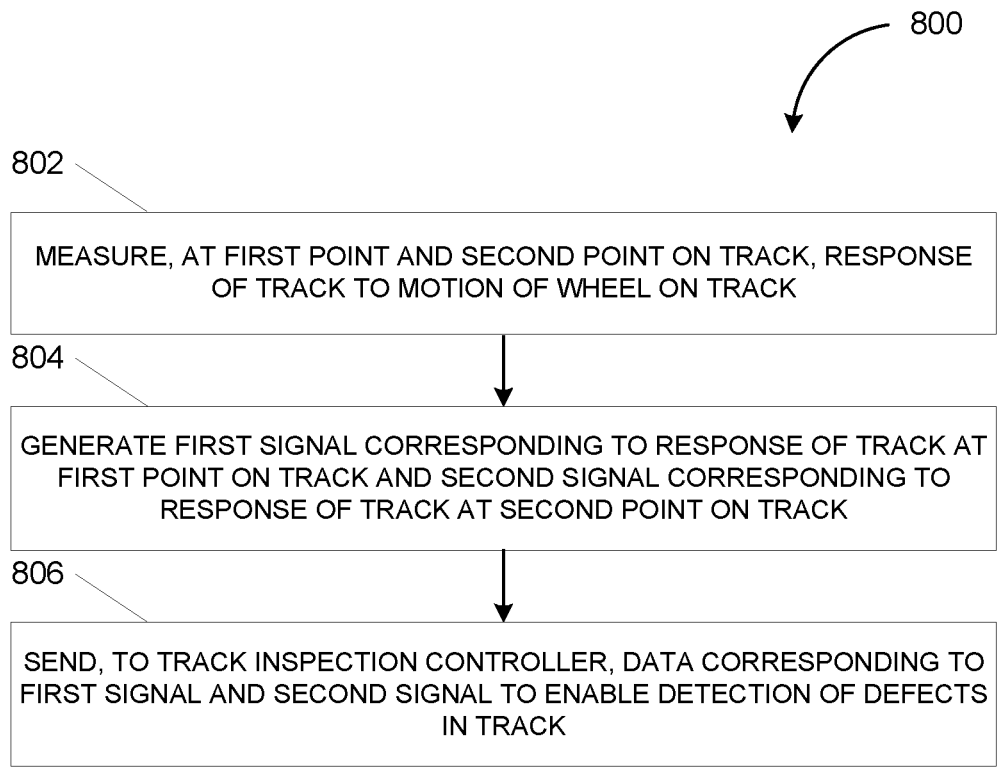
FIG. 8A depicts a flowchart illustrating a process for detecting track defects, in accordance with some example embodiments.

FIG. 8A depicts a flowchart illustrating a process 800 for detecting track defects, in accordance with some example embodiments. Referring to FIG. 8A, the process 800 may be performed by the apparatus 110 which, as shown in FIGS. 1A-C, may be deployed at the rail car 120. For example, the apparatus 110 may be coupled with the wheel 130 of the rail car 120 and/or disposed at a location proximate to the wheel 130.

At 802, the apparatus 110 may measure, at a first location and a second location on the track 140, a response of the track 140 to a motion of the wheel 130 on the track 140. For example, the first sensor 150A may measure, at the first location A on the track 140, the response of the track 140 to the motion of the wheel 130 on the surface of the track 140. Meanwhile, the second sensor 150B may measure, at the second location B on the track 140, the response of the track 140 to the motion of the wheel 130 on the surface of the track 140.

At 804, the apparatus 110 may detect a first signal corresponding to the response of the track 140 at the first location on the track 140 and a second signal corresponding to the response of the track 140 at the second location on the track 140. For example, the first sensor 150A may detect the first signal $V_A$ corresponding to the response of the track 140 at the first location A on the track 140 while the second sensor 150B may detect the second signal $V_B$ corresponding to the response of the track 140 at the second location B on the track 140.

At 806, the apparatus 110 may send, to the track inspection controller 170, data corresponding to the first signal and the second signal to enable a detection of defects in the track 140. In some example embodiments, the apparatus 110 may be communicatively coupled with the track inspection controller 170 via the network 180. As such, the apparatus 110 may send, to the track inspection controller 170, data corresponding to the first signal $V_A$ and the second signal $V_B$. Sending the data to the track inspection controller 170 may enable the track inspection controller 170 to determine, based on the transfer function $G_{AB}$ reconstructed from the first signal $V_A$ and the second signal $V_B$, whether one or more defects (e.g., cracks and/or the like) are present in the track 140.

Figure 8B:
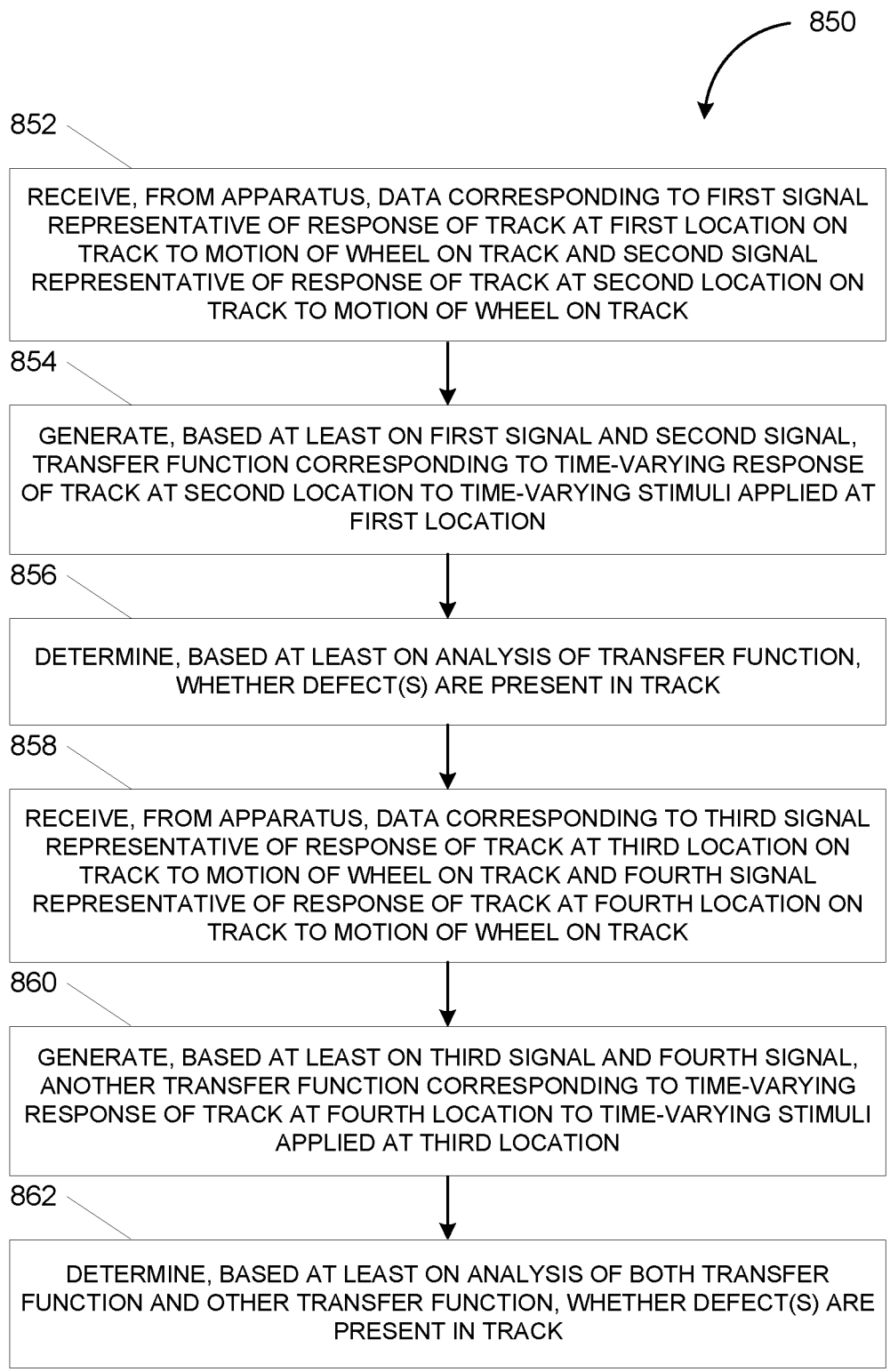
FIG. 8B depicts a flowchart illustrating a process for detecting track defects, in accordance with some example embodiments.

FIG. 8B depicts a flowchart illustrating a process 850 for detecting track defects, in accordance with some example embodiments. Referring to FIG. 8B, the process 850 may be performed by the track inspection controller 170.

At 852, the track inspection controller 170 may receive, from the apparatus 110, data corresponding to a first signal representative of a response of the track 140 at a first location on the track 140 to the motion of the wheel 130 on the track 140 and a second signal representative of a response of the track 140 at a second location on the track 140 to the motion of the wheel 130 on the track 140. As noted, the track inspection controller 170 and the apparatus 110 may be communicatively coupled via the network 170. Thus, in some example embodiments, the track inspection controller 170 may receive, from the apparatus 110, data corresponding to the first signal $V_A$ and the second signal $V_B$. The first signal $V_A$ may correspond to the response of the track 140 to the motion of the wheel 130 at the first location A while the second signal $V_B$ may correspond to the response of the track 140 to the motion of the wheel 130 at the second location B.

At 854, the track inspection controller 170 may generate, based at least on the first signal and the second signal, a transfer function corresponding to a time-varying response of the track 140 at the second location to time-varying stimuli applied at the first location. In some example embodiments, the track inspection controller 170 may convert the first signal $V_A$ and the second signal $V_B$ from a time domain into a frequency domain, for example, by applying a Fast Fourier Transform (FFT). The track inspection controller 170 may further generate the transfer function $G_{AB}$ by subjecting the first signal $V_A$ and the second signal $V_B$ to normalization and cross-correlation, and/or to deconvolution. As noted, the normalization and cross-correlation, and/or the deconvolution may eliminate noise and/or extraneous components such as, for example, the transfer function $W(\omega)$ of the wheel 130, the transfer function $WA(\omega)$ of the portion of the track 140 between the wheel 130 and the first location A, and the transfer function $R(\omega)$ of the first sensor 150A and/or the second sensor 150B. The track inspection controller 170 may further convert the transfer function $G_{AB}$ from the frequency domain back to the time domain by at least subjecting the transfer function $G_{AB}$ to an Inverse Fast Fourier Transform (IFFT).

At 856, the track inspection controller 170 may determine, based at least on an analysis of the transfer function, whether one or more defects are present in the track 140. In some example embodiments, the track inspection controller 170 may determine whether defects are present in the track 140 by at least comparing the transfer function $G_{AB}$ of the track 140 to a baseline transfer function $G_B$ of a defect-free track. The track inspection controller 170 may determine that defects are present in the track 140 based on differences (e.g., arrival time, amplitude, and/or the like) between the transfer function $G_{AB}$ of the track 140 and the baseline transfer function $G_B$ of the defect-free track.

Alternatively and/or additionally, the track inspection controller 170 may determine whether defects are present in the track 140 based on a statistical analysis of the transfer function $G_{AB}$. For example, the track inspection controller 170 may compare the feature vector x of the transfer function $G_{AB}$ to a collection of baseline feature vectors of transfer functions associated with defect-free tracks. This comparison may include performing a principal component analysis, factor analysis, cluster analysis, linear discriminant analysis, mean-square-error analysis, Euclidean distance analysis, a Mahalanobis distance analysis, and/or the like, which may determine how much the feature vector x deviates from the baseline feature vectors. The track inspection controller 170 may determine that defects are present in the track 140 if the deviation (e.g., the Mahalanobis Squared Distance M.S.D.) between the feature vector x deviates from the baseline feature vectors exceeds a threshold value.

At 858, the track inspection controller 170 may receive, from the apparatus 110, data corresponding to a third signal representative of a response of the track 140 at a third location on the track 140 to the motion of the wheel 130 on the track 140 and a fourth signal representative of a response of the track 140 at a fourth location on the track 140 to the motion of the wheel 130 on the track 140. For example, in some example embodiments, the track inspection controller 170 may receive data corresponding to the third signal $V_C$ and the fourth signal third signal $V_D$. The third signal $V_C$ and the fourth signal $V_D$ may correspond to the response of the track 140 at additional locations on the track 140 including, for example, the third location C and the fourth location D.

At 860, the track inspection controller 170 may generate another transfer function corresponding to a time-varying response of the track 140 at the fourth location to time-varying stimuli applied at the third location. For example, in some example embodiments, the track inspection controller 170 may generate the transfer function $G_{CD}$.

At 862, the track inspection controller 172 may determine, based on an analysis of both the transfer function and the other transfer function, whether one or more defects are present in the track 140. In some example embodiments, the track inspection controller 172 may determine whether defects are present in the track 140 by at least comparing the transfer function $G_{AB}$ and the transfer function $G_{CD}$. Any mismatch between the transfer function $G_{AB}$ and the transfer function $G_{CD}$ may indicate the presence of defects in the track 140. Alternatively and/or additionally, the track inspection controller 172 may determine whether defects are present in the track 140 based on a statistical analysis of both the transfer function $G_{AB}$ and the transfer function $G_{CD}$. For example, the statistical analysis of the transfer function $G_{AB}$ and the transfer function $G_{CD}$ may be performed based on a feature vector x of both the transfer function $G_{AB}$ and the transfer function $G_{CD}$. The feature vector x may be compared to a collection of baseline feature vectors of transfer functions associated with defect-free tracks, for example, by performing a principal component analysis, factor analysis, cluster analysis, linear discriminant analysis, mean-square-error analysis, Euclidean distance analysis, a Mahalanobis distance analysis, and/or the like. Doing so may determine how much the ratio between the transfer function $G_{AB}$ and the transfer function $G_{CD}$ deviates from the statistical norm for a defect-free track. The track inspection controller 170 may determine that defects are present in the track 140 if the deviation (e.g., the Mahalanobis Squared Distance M.S.D.) exceeds a threshold value.

Figure 9:
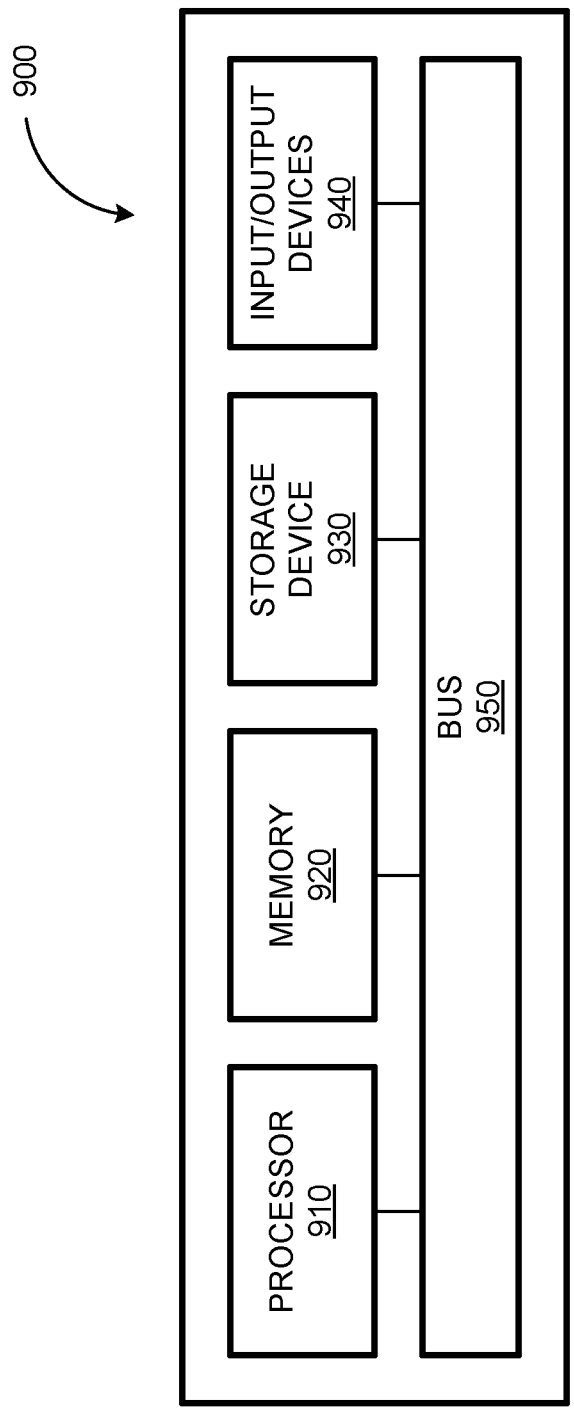
FIG. 9 depicts a block diagram illustrating a computing system, in accordance with some example embodiments.

FIG. 9 depicts a block diagram illustrating a computing system location, in accordance with some example embodiments. Referring to FIGS. 1A-D and 9, the computing system location can be used to implement the track inspection controller 170 and/or any component therein.

As shown in FIG. 9, the computing system 500 can include a processor 910, a memory 920, a storage device 930, and input/output devices 940. The processor 910, the memory 920, the storage device 930, and the input/output devices 940 can be interconnected via a system bus 950. The processor 910 is capable of processing instructions for execution within the computing system 500. Such executed instructions can implement one or more components of, for example, the adaptive filter platform 110, the client 120, the publisher server 140, the first bidding server 160A, the second bidding server 160B, the first advertisement server 170A, and/or the second advertisement server 170B. In some example embodiments, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 500. The memory 920 can store data structures representing configuration object databases, for example. The storage device 930 is capable of providing persistent storage for the computing system 500. The storage device 930 can be a floppy disk device, a hard disk device, an optical disk device, or a tape device, or other suitable persistent storage means. The input/output device 940 provides input/output operations for the computing system 500. In some example embodiments, the input/output device 940 includes a keyboard and/or pointing device. In various implementations, the input/output device 940 includes a display unit for displaying graphical user interfaces.

According to some example embodiments, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 940. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. An apparatus for ultrasonic railroad track inspection, comprising: a first ultrasonic sensor comprised on a rail car and configured to at least detect a first signal, the first signal corresponding to a first response of the railroad track at a first location on the railroad track, the first response caused at least in part due to a motion of a rail car wheel as the rail car wheel travels over a surface of the railroad track; a second ultrasonic sensor comprised on the rail car and configured to at least detect a second signal, the second signal corresponding to a second response of the railroad track at a second location on the railroad track, the second response caused at least in part due to the motion of the rail car wheel as the rail car wheel travels over the surface of the railroad track, wherein the first ultrasonic sensor and the second ultrasonic sensor are each proximate to the railcar wheel to enable the detection of the first signal and the second signal, wherein the first response and the second response each comprise ultrasonic waves propagating through the railroad track caused by the motion of the rail car wheel as the rail car wheel travels over the surface of the railroad track; and a controller communicatively coupled to the first ultrasonic sensor and the second ultrasonic sensor and configured to at least: generate, based on the first signal and the second signal, a first transfer function associated with a first portion of the railroad track between the first location and the second location, the first transfer function corresponding to a third response of the railroad track at the second location to stimuli applied by the rail car wheel making contact at the first location on the railroad track; and determine, based at least on an analysis of the first transfer function, whether one or more defects are present in the railroad track.

2. The apparatus of claim 1, wherein the controller is further configured to at least apply a Fast Fourier Transform to the first signal and/or the second signal in order to convert the first signal and/or the second signal from a time domain into a frequency domain.

3. The apparatus of claim 2, wherein the controller is further configured to at least apply an Inverse Fast Fourier Transform to the first transfer function in order to convert the first transfer function from the frequency domain into the time domain.

4. The apparatus of claim 1, wherein the analysis of the first transfer function comprises comparing the first transfer function to a baseline transfer function associated with a defect-free railroad track, and wherein the one or more defects are determined to be present in the railroad track based at least on one or more differences between the first transfer function and the baseline transfer function.

5. The apparatus of claim 1, wherein the analysis of the first transfer function comprises:
generating a feature vector that includes at least one feature associated with the first transfer function; and
comparing the feature vector to a plurality of baseline feature vectors of transfer functions associated with defect-free railroad tracks, the comparison determining how much the first transfer function deviates from the transfer functions associated with the defect-free railroad tracks.

6. The apparatus of claim 5, wherein the comparison comprises a principal component analysis, factor analysis, cluster analysis, linear discriminant analysis, mean-square-error analysis, Euclidean distance analysis, and/or a Mahalanobis distance analysis.

7. The apparatus of claim 1, further comprising:
a third ultrasonic sensor comprised on the rail car and configured to at least detect a third signal, the third signal corresponding to a fourth response of the railroad track, at a third location on the railroad track, to the motion of the rail car wheel on the railroad track; and
a fourth ultrasonic sensor comprised on the rail car and configured to at least detect a fourth signal, the fourth signal corresponding to a fifth response of the railroad track, at a fourth location on the railroad track, to the motion of the rail car wheel on the railroad track.

8. The apparatus of claim 7, wherein the controller is further configured to at least:
generate, based at least on the third signal and the fourth signal, a second transfer function associated with a second portion of the railroad track between the third location and the fourth location, the second transfer function corresponding to a sixth response of the railroad track at the fourth location to stimuli applied at the third location; and
determine, based at least on an analysis of the first transfer function and the second transfer function, whether the one or more defects are present in the railroad track.

9. The apparatus of claim 8, wherein the analysis comprises comparing the first transfer function and the second transfer function, and wherein the one or more defects are determined to be present in the railroad track based at least on a mismatch between the first transfer function and the second transfer function.

10. The apparatus of claim 9, wherein the analysis comprises:
generating a feature vector that includes at least one ratio of a feature associated with the first transfer function and a corresponding feature associated with the second transfer function; and
comparing the feature vector to a plurality of baseline feature vectors of transfer functions associated with defect-free railroad tracks, the comparison determining how much the first transfer function and the second transfer function deviate from the transfer functions associated with the defect-free railroad tracks.

11. The apparatus of claim 1, wherein the first ultrasonic sensor and/or the second ultrasonic sensor comprise non-contact sensors capable of measuring the response of the railroad track without making physical contact with the railroad track.

12. The apparatus of claim 1, wherein the first signal comprises a product of a second transfer function associated with the rail car wheel, a third transfer function associated with the portion of the railroad track between the rail car wheel and the first location, and a fourth transfer function associated with the first ultrasonic sensor and/or the second ultrasonic sensor, and wherein the second signal comprises a product of the first transfer function, the second transfer function, the third transfer function, and the fourth transfer function.

13. The apparatus of claim 12, wherein the controller is configured to generate the first transfer function by at least processing the first signal and the second signal to remove the second transfer function, the third transfer function, and the fourth transfer function.

14. The apparatus of claim 13, wherein the processing comprises determining a cross-correlation the first signal and the second signal, and normalizing the cross-correlation of the first signal and the second signal.

15. The apparatus of claim 13, wherein the processing comprises determining a deconvolution of the first signal and the second signal by at least computing a ratio between the first signal and the second signal.

16. The apparatus of claim 1, wherein the first ultrasonic sensor and the second sensor are oriented at an angle from a vertical axis of the railroad track.

17. A method for ultrasonic railroad track inspection, comprising: detecting, by a first ultrasonic sensor comprised on a rail car, a first signal, the first signal corresponding to a first response of the railroad track at a first location on the railroad track, the first response caused at least in part due to a motion of a rail car wheel as the rail car wheel travels over a surface of the railroad track; detecting, by a second ultrasonic sensor comprised on the rail car, a second signal, the second signal corresponding to a second response of the railroad track at a second location on the railroad track, the second response caused at least in part due to the motion of the rail car wheel as the rail car wheel travels over the surface of the railroad track, wherein the first ultrasonic sensor and the second ultrasonic sensor are each proximate to the railcar wheel to enable the detection of the first signal and the second signal, wherein the first response and the second response each comprise ultrasonic waves propagating through the railroad track caused by the motion of the rail car wheel as the rail car wheel travels over the surface of the railroad track; generating, based at least on the first ultrasonic signal and the second ultrasonic signal, a first transfer function associated with a first portion of the railroad track between the first location and the second location, the first transfer function corresponding to a third response of the railroad track at the second location to stimuli applied by the rail car wheel making contact at the first location on the railroad track; and determining, based at least on an analysis of the first transfer function, whether one or more defects are present in the railroad track.

18. The method of claim 17, wherein the first signal comprises a product of a second transfer function associated with the rail car wheel, a third transfer function associated with the portion of the railroad track between the rail car wheel and the first location, and a fourth transfer function associated with the first ultrasonic sensor and/or the second ultrasonic sensor, and wherein the second signal comprises a product of the first transfer function, the second transfer function, the third transfer function, and the fourth transfer function.

19. The method of any of claim 18, wherein the controller is configured to generate the first transfer function by at least processing the first signal and the second signal to remove the second transfer function, the third transfer function, and the fourth transfer function.

\* \* \* \* \*